United States Patent
Sekine et al.

(10) Patent No.: US 7,000,129 B2
(45) Date of Patent: *Feb. 14, 2006

(54) COMPUTER PERIPHERAL DEVICE, ITS CONTROL METHOD, IMAGE PICKUP DEVICE, STORAGE MEDIUM, COMPUTER SYSTEM, AND COMPUTER

(75) Inventors: Masayoshi Sekine, Tokyo (JP); Takashi Aizawa, Kanagawa-ken (JP); Yuji Koide, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 125 days.

This patent is subject to a terminal disclaimer.

(21) Appl. No.: 10/677,670

(22) Filed: Oct. 3, 2003

(65) Prior Publication Data

US 2004/0073819 A1    Apr. 15, 2004

Related U.S. Application Data

(62) Division of application No. 09/641,977, filed on Aug. 21, 2000, now Pat. No. 6,662,301.

(30) Foreign Application Priority Data

Aug. 27, 1999  (JP) .................................. 11-240903
Aug. 21, 2000  (JP) .................................. 11-240906

(51) Int. Cl.
*G06F 1/32* (2006.01)

(52) U.S. Cl. ..................................... 713/320; 713/300
(58) Field of Classification Search ................ 713/300, 713/320
See application file for complete search history.

(56) References Cited

U.S. PATENT DOCUMENTS

| | | | |
|---|---|---|---|
| 5,463,261 A | 10/1995 | Skarda et al. | ................ 307/131 |
| 5,515,539 A | 5/1996 | Ohashi et al. | ............... 395/750 |
| 5,659,763 A | 8/1997 | Ohashi | .................... 395/750.03 |
| 5,925,132 A | 7/1999 | Kadokura | .................... 713/323 |
| 6,209,105 B1 | 3/2001 | Hamamoto | .................. 713/300 |
| 6,662,301 B1 * | 12/2003 | Sekine et al. | ................ 713/320 |

* cited by examiner

*Primary Examiner*—Chun Cao
(74) *Attorney, Agent, or Firm*—Fitzpatrick, Cella, Harper & Scinto

(57) ABSTRACT

A peripheral connected to a host computer is prevented from unexpectedly coming to be in a non-connection state due to control of the host computer. Further, even when the peripheral such as an electronic camera cannot enough receive power necessary for the device itself from a connection line such as a USB, the peripheral is made to be able to use the power effectively. To achieve this, there is disclosed a computer peripheral which is connected to the host computer and comprises a connection signal transmitter for transmitting to the host computer a signal to control the connection with the host computer and a controller for shifting an operation state of the computer peripheral to a low consumption current mode after notifying a user and obtaining approval of the user before transmitting a signal to control into the disconnection state to the host computer by the connection signal transmitter.

42 Claims, 7 Drawing Sheets

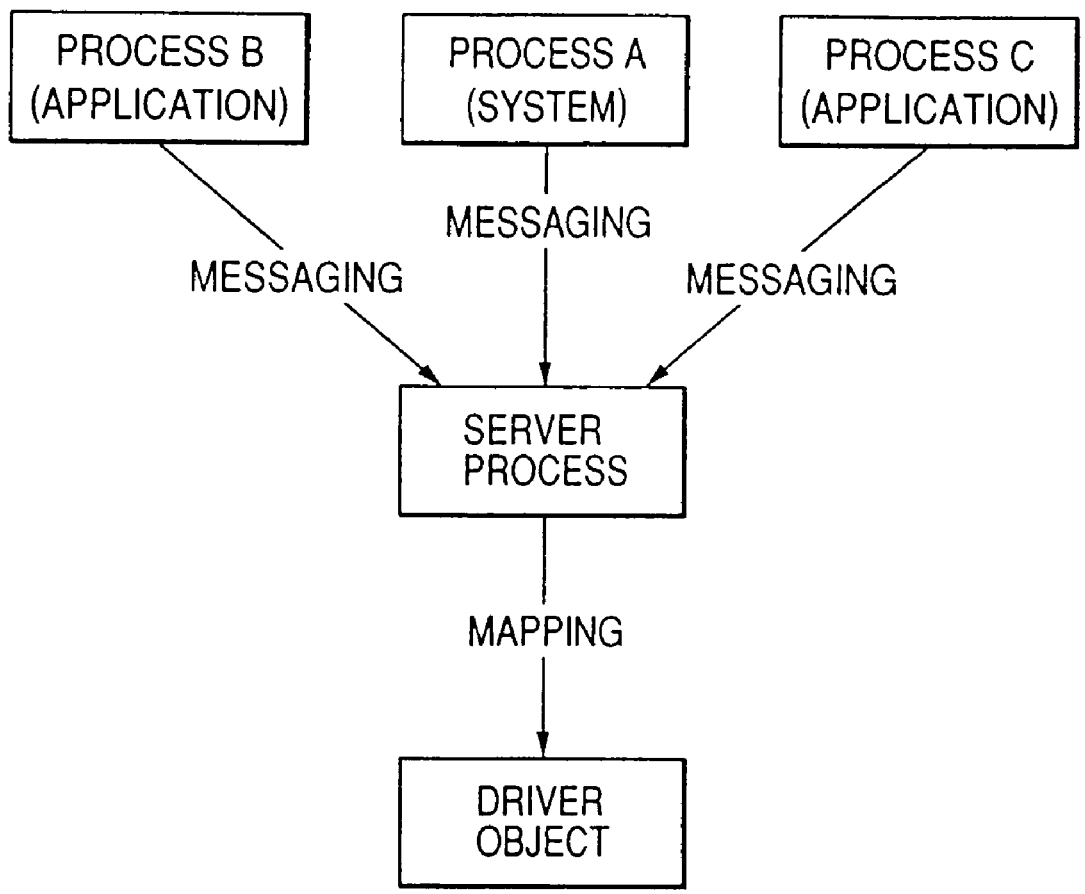

COMPUTER PERIPHERAL DEVICE, ITS CONTROL METHOD, IMAGE PICKUP DEVICE, STORAGE MEDIUM, COMPUTER SYSTEM, AND COMPUTER

This application is a division of application Ser. No. 09/641,977, filed Aug. 21, 2000, now U.S. Pat. No. 6,662, 301, issued on Dec. 9, 2003.

BACKGROUND OF THE INVENTION

1. Field of the Invention

The present invention relates to a computer system, its peripheral device, a computer, a control method thereof and a storage medium. More concretely, the present invention relates to a computer system which has a low power consumption state and a computer peripheral device capable of freely managing communication connection with a host computer, its peripheral device, a computer, a control method and a storage medium.

2. Related Background Art

In recent years, a method based on USB (Universal Serial Bus) was put to practical use as a method to connect peripheral devices with a personal computer (PC).

The USB which is the standard for connecting the personal computer with the plural peripheral devices in serial communication has Plug and Play (a function for automatically recognizing connection relations when the peripheral device is newly connected and disconnected), Hot Insertion (a function capable of connecting and disconnecting the peripheral device with a power supply on) or a hot-line insertion/separation function, and a power supply function. Thus, the USB is designed such that a user is never suffered for setting of addresses and ID numbers when he connects the peripheral devices with the personal computer. In the USB, four lines (a 5V power supply line called a VBUS line, a ground line called a GND line, a D+ signal line and a D− signal line) in total are detachably connected between the personal computer and the peripheral device by using a dedicated connector. There is a limit in a current value which can be supplied in the power supply line. Namely, on the USB standard, such the current value is limited to 100 mA and 500 mA.

Further, it is defined in the USB that the peripheral device must enter a suspend state by an instruction of a host computer. In this suspend state, it is necessary to reduce current consumption from the VBUS line with 500 $\mu$A. Incidentally, the peripheral device is restored by a resuming instruction.

The following problems are in the conventional USB peripheral devices.

Namely, regardless of the USB, when the power is supplied from the host computer side, naturally there is a limitation in the supplied current. Therefore, a high-speed circuit or machine which flows a large current exceeding the limitation value of the supply current cannot be installed in the peripheral device. In a digital still camera, a large current is temporarily necessary to charge an electronic flash and force back a shutter spring. However, due to the above limitation, the digital still camera could not be used as the USB peripheral device, especially as the USB peripheral device to which power is supplied from the host computer.

When a suspend instruction is issued from the host computer, the USB peripheral device must promptly suppress the current from the power supply. For example, when the power supply is intercepted while data is being written on a memory card, in the worst case there is a problem that the data in the memory card is destroyed. Therefore, it is difficult to use as the peripheral device a device such as an electronic still camera which writes some data, especially a large amount of data, on a memory card.

In a case where the peripheral device itself has a power supply, when an equipment required to carry is such the peripheral device, it has a built-in battery. However, especially in the USB, a communication circuit on the side of the peripheral device must always operate while the peripheral device is connected with the personal computer. This is because, since the host computer always generates a packet signal, this communication circuit must judge whether the generated packet signal is for this circuit itself and must respond to the host computer within a predetermined time if judged that the generated packet signal is for this circuit itself. Therefore, if the battery-driven device is connected with the USB as the USB peripheral device, an operation mode can not be shifted to a power saving mode, whereby the battery is consumed in a short time.

Further, in the USB, the host computer can recognize that the a USB device was removed, due to a decrease in a voltage level of the D+ line. When it is judged that the USB device is removed from a USB bus, a device driver (software) corresponding to the removed device is unloaded from a memory. Thus, only while the USB device is connected with the USB bus, the corresponding device driver (software) can be used on the host computer.

On the other hand, regardless of the USB, various kinds of devices which are connected with the personal computer and used conventionally exist. In some of these devices, for the purpose of power saving, an operation state is changed to a power saving mode or a power-off state when there is no access for a certain time.

Further, a digital camera which turns off a power supply when a state that any operation is not received continues for a certain time has been actually manufactured.

In the conventional USB, when the power supply of the USB device is turned off for power saving, also feeding to a pull-up resistor of the D+ line of the USB cable stops, whereby the voltage level of the D+ line decreases. As a result, though this USB device is connected with the host computer via the USB cable, the host computer judges that this USB device was removed and thus unloads the device driver (software) corresponding to this device, whereby this USB device can not be used. Namely, for a user of this peripheral device, a nonunderstandable situation that this USB device can not be used suddenly without any warning occurs.

Further, like another connection means, even if the device puts out some warning on a host computer for a user before the device comes to be in a power saving mode, there is the following problem.

Unlike a conventional RS-232C connection device, the USB device must be in a state capable of performing communication at the time when this device is connected with the host computer because of the following reason. Namely, in case of the RS-232C device, it is convenient that the host computer can communicate with the device only when the device is used. However, in case of the USB device, it is necessary to be able to transmit and receive a USB request signal necessary to recognize and structure the device at the time when the device is connected.

In a state that application software which can understand a message sent from the device does not start, when any operation to the device is not performed for a certain time, like the RS-232C connection device the message is sent to the application software to cause this software to display a warning to the user. However, at this time, since the application software which manages the USB device does not start yet, it is impossible to display the warning to the user.

SUMMARY OF THE INVENTION

An object of the present invention is to solve all or at least one of the above conventional problems.

Another object of the present invention is to prevent that a peripheral device connected with a host computer unexpectedly enters a disconnection state by control of the host computer.

Still another object of the present invention is to provide a peripheral device such as an electronic camera or the like which can effectively use necessary power even if such the power can not be sufficiently obtained from a connection line such as a USB line or the like.

Under such the object, it is disclosed a computer peripheral device which is connected with a host computer, comprising:

connection signal transmission means for transmitting to a host computer a signal for controlling connection to the host computer; and control means for shifting, after the connection signal transmission means transmits to the host computer a signal for control into a disconnection state, an operating state of the computer peripheral device into a low consumption current mode.

Still another object of the present invention is to improve user's convenience when a peripheral device such as a digital camera or the like connected with a host computer comes to be in a low consumption current mode.

Under such the object, it is disclosed a computer system comprising:

a host computer;

a peripheral device connectable with the host computer and shifting to be in a low consumption current mode under a predetermined condition; and a connection medium for connecting the host computer and the peripheral device with each other and interactively transmitting a connection signal representing a connection state of the host computer and the peripheral device, between the host computer and the peripheral device, wherein the peripheral device notifies the host computer of a predetermined message prior to shifting to be in the low consumption current mode, and the host computer notifies the user of a content corresponding to the predetermined message.

Other objects and features of the present invention will become apparent from the following detailed description and the attached drawings.

BRIEF DESCRIPTION OF THE DRAWINGS

FIG. 9 is a diagram showing another operation model on the host PC 10.

DETAILED DESCRIPTION OF THE PREFERRED EMBODIMENTS

Hereinafter, the embodiments of the present invention will be explained in detail with reference to the attached drawings.

(First Embodiment)

Figure 1:
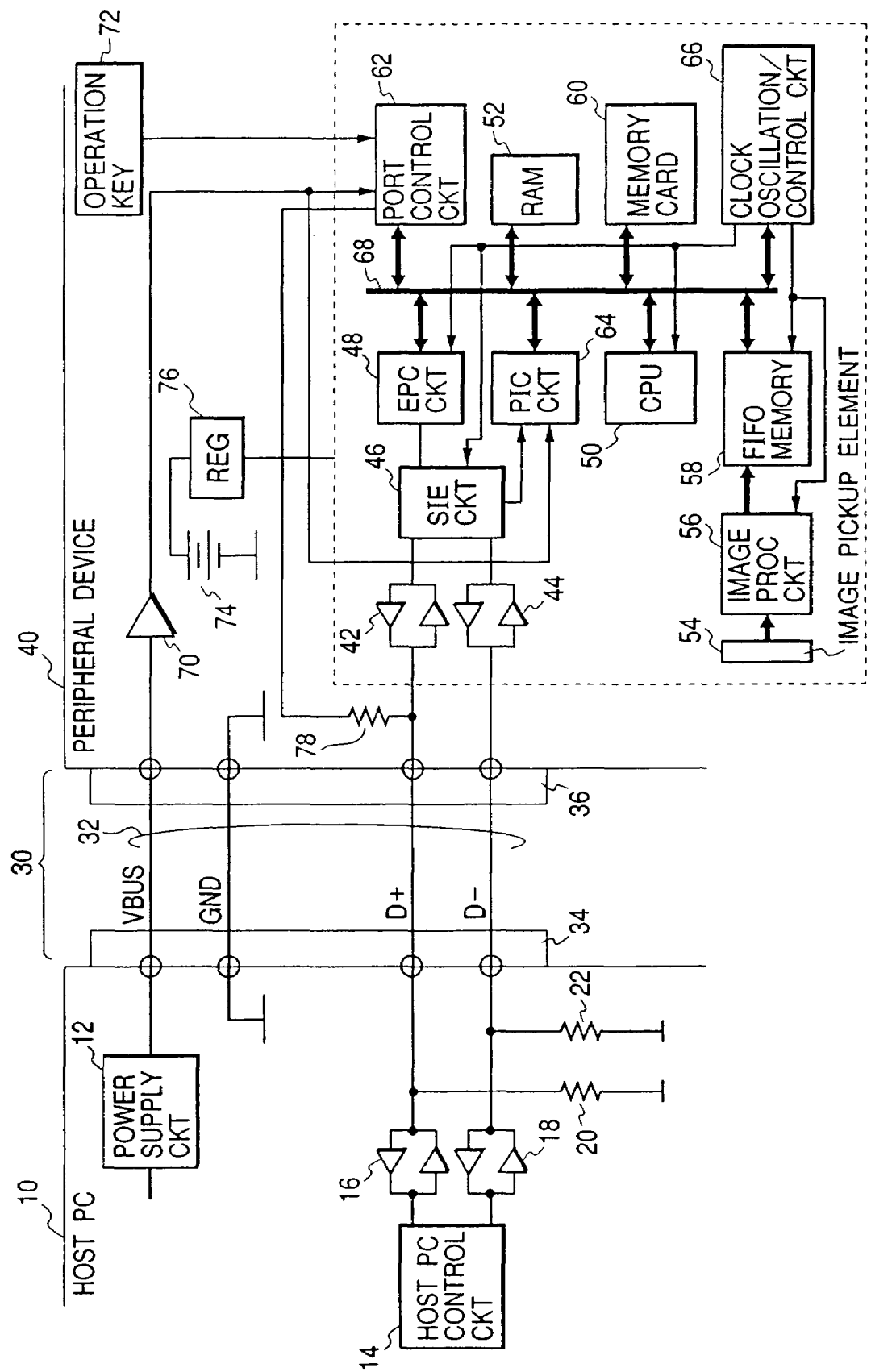
FIG. 1 is a block diagram showing the schematic structure of the first embodiment of the present invention.

FIG. 1 is a block diagram showing the schematic structure of the first embodiment of the present invention.

In FIG. 1, a host PC 10 is connected with a peripheral device 40 through a USB cable 30. In the present embodiment, an electronic still camera is used as the peripheral device 40.

The host PC 10 is composed of a power supply circuit 12 which supplies power on a VBUS line, a USB host PC control circuit 14 which performs communication by using a USB, a USB data buffers 16 and 18, a pull-down resistor 20 of a D+ line, and a pull-down resistor 22 of a D− line. The USB cable 30 is composed of a signal cable 32 which includes the VBUS line, a GND line, the D+ line and the D− line, and connectors 34 and 36 which are disposed on both the sides of the signal cable 32. The connector 34 is connected with the host PC 10, while the connector 36 is connected with the peripheral device 40. Structures and operations of the USB host PC 10 and the USB cable 30 are the same as those of a conventional USB host computer and a conventional USB cable, respectively.

The peripheral device 40 is composed of the following components. Namely, numerals 42 and 44 denote USB data buffers, and numeral 46 denotes an SIE circuit which converts a USB serial signal into a parallel signal and vice versa. Numeral 48 denotes an EPC circuit which controls data transmission and reception according to a USB protocol, numeral 50 denotes a CPU which controls the peripheral device 40 as a whole, and numeral 52 denotes a RAM which acts as a working memory for the CPU 50. Numeral 54 denotes an image pickup element which converts an optical image into an electrical signal, numeral 56 denotes an image process circuit which performs a camera signal process to the output image signal from the image pickup element 54, numeral 58 denotes an FIFO memory which temporarily stores the output from the image process circuit 56, and numeral 60 denotes a detachable memory card which finally stores the picked-up image. Numeral 62 denotes a port control circuit, numeral 64 denotes a programmable interruption control (PIC) circuit, and numeral 66 denotes a clock oscillation/control circuit.

The EPC circuit 48, the CPU 50, the RAM 52, the FIFO memory 58, the memory card 60, the port control circuit 62, the PIC circuit 64 and the clock oscillation/control circuit 66 are all connected with a system bus 68.

Numeral 70 denotes a latch-up prevention buffer which is connected with the VBUS line of the signal cable 32. The output from the buffer 70 is supplied to the port control circuit 62. Numeral 72 denotes an operation key of the peripheral device 40, and numeral 74 denotes a battery which acts as the power supply of the peripheral device 40. Numeral 76 denotes a voltage regulator (REG) which generates a predetermined power supply voltage from an output voltage of the battery (power supply) 74 and supplies the generated voltage to a block surrounded by a doted line. Numeral 78 denotes a pull-up resistor which is connected between the port control circuit 62 and the D+ line of the USB cable 32. It should be noted that resistance of the pull-up resistor 78 is 1.5 KΩ.

Next, an operation of the peripheral device 40 will be explained.

The peripheral device 40 operates based on the voltage generated by the battery 74 and the REG 76. Operations of the USB buffers 42 and 44 and the EPC circuit 48 are the same as those of conventional USB buffers and EPC circuit, respectively. In addition to functions of a conventional SIE circuit, the SIE circuit 46 has a function to supply a signal representing a state of a USB signal (concretely, a signal representing that the D+ and D− lines enter a suspend state, and a signal representing that the D+ and D− lines restore from the suspend state and enter a resuming state) to the PIC circuit 64.

The clock oscillation/control circuit 66 can output a clock of which frequency is indicated by the CPU 50. For example, at high-speed signal transfer based on the USB, and before and after the photographing, high process performance is needed to the CPU 50 to control an image process and a photographing lens system. Thus, the CPU 50 causes the clock oscillation/control circuit 66 to output a high-frequency operation clock. Conversely, when the peripheral device 40 is not connected with the USB, and when any photographing is not performed, the frequency of the clock generated from the clock oscillation/control circuit 66 is lowered, thereby reducing power consumption of the entire device. Further, when the USB communication is performed but any photographing is not performed, it is possible to stop clock supply itself to the image pickup element 54, the image process circuit 56 and the FIFO memory 58. Thus, by controlling the clock frequency, or by stopping the clock supply according to circumstances, the power consumption is gradually reduced, thereby preventing consumption of the battery 74.

The buffer 70 outputs an H- or L-level signal according to whether or not the voltage exceeding a predetermined level is applied to the VBUS line. When the output from the buffer 50 changes from the L-level signal to the H-level signal or from the H-level signal to the L-level signal, the PIC circuit 64 detects the changed signal as an interruption signal. Namely, in the state that the operation power is being supplied by the battery 74, it is possible to know whether or not the peripheral device 40 is physically connected with the host PC 10 on the basis of the output level of the buffer 70. The change of the output of the buffer 70 from the L-level signal to the H-level signal represents that the removed connector 34 or 36 is connected by the user. Therefore, for example, if the CPU 50 was in the power saving mode till then, it is possible to change the operation mode of the CPU 50 to a high speed mode according to the change of the output level of the buffer 70. Further, the L-level state of the output of the buffer 70 represents that the peripheral device 40 is not connected with the host PC 10. In this case, even if the CPU 50 operates in the high speed mode for the photographing, it is possible to stop the clock supply to the SIE circuit 46 and the EPC circuit 48, whereby it is possible to reduce useless power consumption.

The port control circuit 62 reads the output of the buffer 70 and a key-operated result of the operation key 72. According to the read result of the port control circuit 62 or an instruction of the CPU 50, it is controlled to apply the voltage to the pull-up resistor 78. When the voltage applied to the pull-up resistor 78 is set to 3.3V, pull-up can be performed to the D+ line. When the voltage applied is set to 0V or Hiz, pull-down or release can be performed to the D+ line. Thus, in the state that preparation for the communication of the peripheral device 40 is complete, when the pull-up is performed to the pull-up resistor 78, it is possible to cause the host PC 10 to recognize that the peripheral device 40 has been connected by the USB cable 30.

Conversely, in the state that the preparation for the communication is not complete, when the pull-down or the release is performed to the pull-up resistor 78, it is possible to cause the host PC 10 to recognize that the peripheral device 40 is not connected. Thus, the host PC 10 does not start communication concerning address setting with the peripheral device 40. At the time when the preparation for the communication of the peripheral device 40 is complete, when the pull-up is performed to the pull-up resistor 78, the host PC 10 recognizes that the peripheral device 40 is connected.

Figure 2:
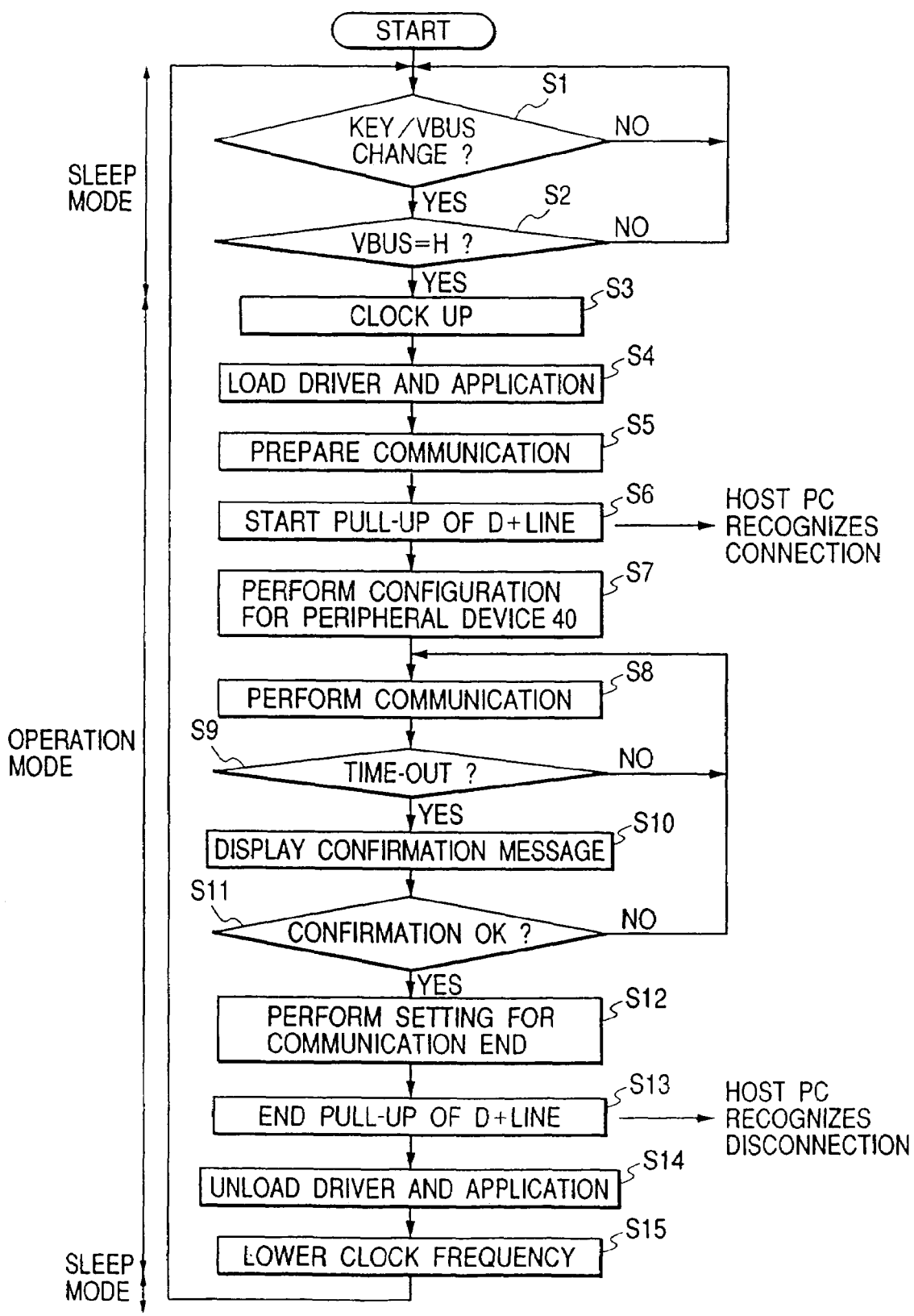
FIG. 2 is a flow chart showing the operation of the first embodiment.

FIG. 2 is a flow chart showing the operation of the present embodiment. The operation of the present invention will be explained in detail with reference to FIG. 2. In the operation, it is assumed that the peripheral device 40 is in a sleep mode and is not connected with the host PC 10 by the USB.

The port control circuit 62 observes or supervises whether or not the VBUS line (the output of the buffer 70) is changed and whether or not key input is performed (S1). If judged in the step S1 that the VBUS line (the output of the buffer 70) is changed, or the key input is performed, then it is judged whether or not the signal level of the VBUS line is H level (S2). The port control circuit 62 may regularly inspect a port to which the signal is input, or may detect a change of the port by interruption.

If judged that the signal level of the VBUS is changed to H level (S2), the CPU 50 causes the clock oscillation/control circuit 66 to raise the clock frequency to shift the sleep mode to an operation mode (S3). Then the clock supply to the SIE circuit 46 and the EPC circuit 48 concerning the USB is started.

When an operating system (OS) has been unloaded, the OS is loaded and started, and driver and transfer applications for the USB communication are started (S4). Then necessary preparation such as setting of the SIE circuit 46 and the EPC circuit 48 and securement of a memory area is performed for the USB communication (S5).

The port control circuit 62 applies the predetermined voltage to the pull-up resistor 78 to perform the pull-up of the D+ line (S6). Thus, the host PC 10 recognizes that the peripheral device 40 is connected on the USB bus. Then the host PC 10 performs configuration of the peripheral device 40, and performs the process to enable the communication such as address setting through the USB bus (S7).

After then, the peripheral device 40 appropriately communicates with the host PC 10 according to a request of the host PC 10 (S8). Such communication includes communication which is performed by the driver of the host PC 10 if necessary and communication which is started according to user's operations (e.g., an instruction of camera photographing, image transfer during finder photographing, file transfer to the memory card 60, and the like). When there is no access for a predetermined time (e.g., ten minutes), it is judged that the operation is in a time-out (S9). If judged so, the communication is interrupted. However, a case where the user is scheduled to still perform communication such as file transfer or the like is thought. For this reason, a confirmation message is displayed on a screen (S10), and the flow waits for user's acceptance (S11). When the user's acceptance can be obtained (S11), a communication end process is performed to notify the host PC 10 of communication end, and setting for the communication end is performed in the peripheral device 40 (S12).

The port control circuit 62 changes the voltage applied to the pull-up resistor 78 to L level or HiZ (S13). Thus, the host PC 10 recognizes that the peripheral device 40 is removed from the USB bus.

Then the driver software and the communication application software used in the USB communication are unloaded, and the secured memory area is released (S14). Further, the frequency of the clock output from the clock oscillation/control circuit 66 is set to be low, and the mode is again shifted to the sleep mode (S15). In this sleep mode, it is possible not only to lower the frequency of the clock supplied to the CPU 50 but also to stop clock supply to a USB interface. When it is structured to be able to selectively stop power supply to the USB interface, it is possible to stop the power supply.

When the user wishes to release the sleep mode to restart the communication, he may once remove the USB connector 32 or 34 and reconnect it, or he may once perform some key operations (S1, S2).

Since the peripheral device 40 contains the battery as the power supply, it is possible to provide an actuator, an electronic flash charge circuit and the like of which supply current exceeds that of the USB. Further, since the power supply is not intercepted only by convenience of the host PC 10, recording data on the memory card is not destroyed even if the power is down while the data is being written on the memory card.

When there is no access to the peripheral device 40 for the predetermined time, it is possible to automatically suppress consumption of the battery 74, whereby it is possible to remarkably extend a lifetime of the battery 74.

When the mode is shifted to the sleep mode, the communication end is previously notified to the host PC 10, there is no danger of abnormal end. When the operation is restarted, the peripheral device which was once removed from the bus is reconnected in the same procedure as above. Thus, since the communication is not prepared on the side of the peripheral device, an error does not occur. In order to reconnect the peripheral device, the user merely touches any key on the side of the peripheral device or once removes the USB connector and then reconnects it, the load of the operation is a little.

Although the present embodiment was explained for the case of the USB bus by way of example, the present invention is applicable to a case where another communication medium is used instead of the USB bus.

(Second Embodiment)

Figure 3:
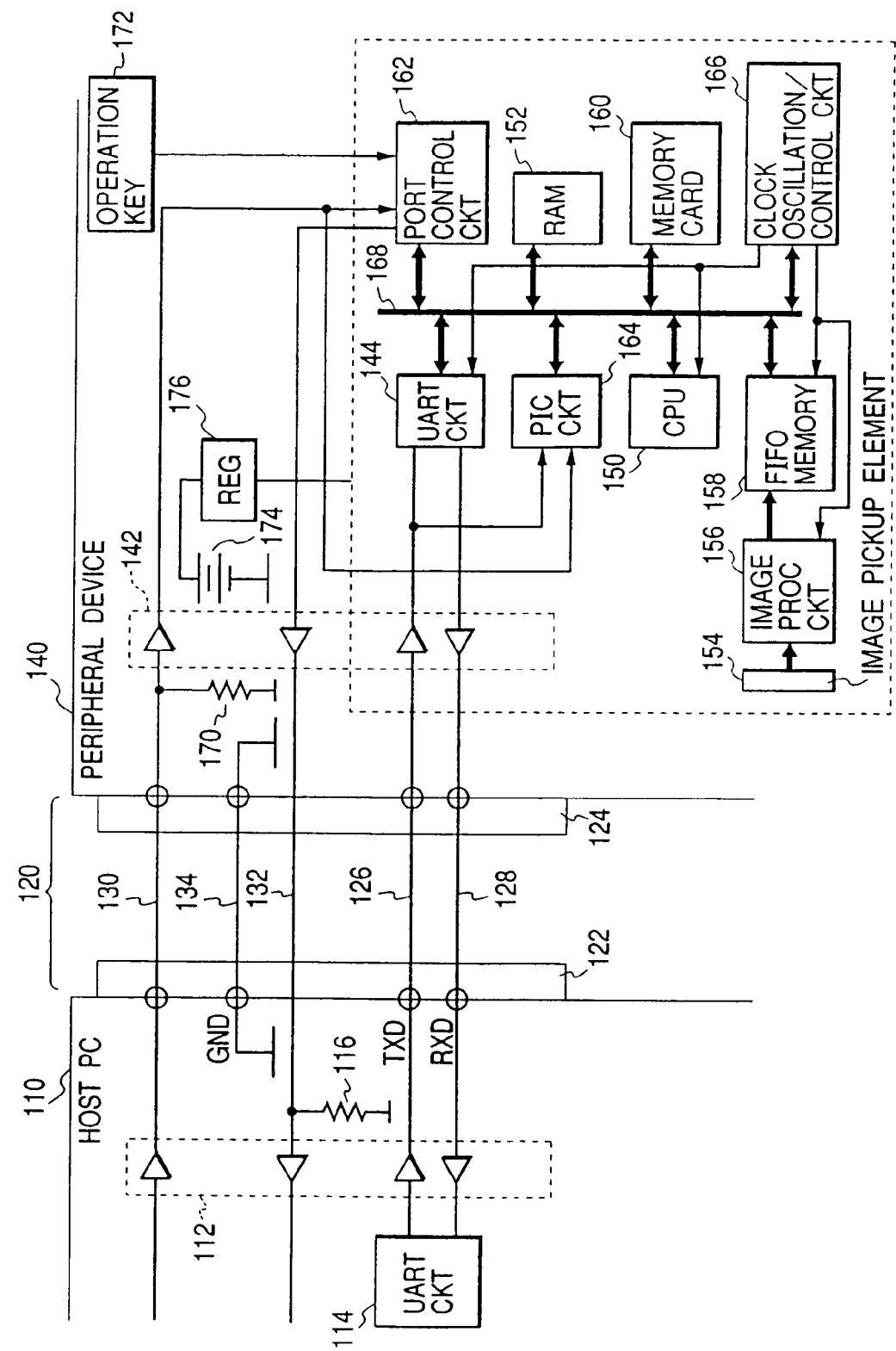
FIG. 3 is a block diagram showing the schematic structure of the second embodiment of the present invention.

FIG. 3 is a block diagram showing the schematic structure of the second embodiment of the present invention wherein a computer and its peripheral device are connected with each other through an RS-232C cable.

In FIG. 3, a host PC 110 is connected with a peripheral device 140 through an RS-232C cable 120. The RS-232C cable 120 is composed of connectors 122 and 124 which are disposed on both the sides thereof, signals lines 126, 128, 130 and 132 and a ground line 134. In the RS-232C cable, ordinarily interactive communication can be performed only by the signal lines 126 and 128. However, in the present embodiment, also the signal lines 130 and 132 are used.

The host PC 110 is composed of an RS-232C driver 112 which is connected with the signal lines 126, 128, 130 and 132, a UART circuit 114, and a pull-down resistor 116 which is connected with the signal line 132.

The peripheral device 140 is composed of the following components. Namely, numeral 142 denotes an RS-232C driver, numeral 144 denotes a UART circuit, numeral 150 denotes a CPU which controls the peripheral device 140 as a whole, and numeral 152 denotes a RAM which acts as a working memory for the CPU 150. Numeral 154 denotes an image pickup element which converts an optical image into an electrical signal, numeral 156 denotes an image process circuit which performs a camera signal process to the output image signal from the image pickup element 154, numeral 158 denotes an FIFO memory which temporarily stores the output from the image process circuit 156, and numeral 160 denotes a detachable memory card which finally stores the picked-up image. Numeral 162 denotes a port control circuit, numeral 164 denotes a programmable interruption control (PIC) circuit, and numeral 166 denotes a clock oscillation/control circuit.

The UART circuit 144, the CPU 150, the RAM 152, the FIFO memory 158, the memory card 160, the port control circuit 162, the PIC circuit 164 and the clock oscillation/control circuit 166 are all connected with a system bus 168.

Numeral 170 denotes a pull-down resistor which is connected with the signal line 130, numeral 172 denotes an operation key of the peripheral device 140, and numeral 174 denotes a battery which acts as a power supply of the peripheral device 140. Numeral 176 denotes a voltage regulator (REG) which generates a predetermined power supply voltage from an output voltage of the battery (power supply) 174 and supplies the generated voltage to a block surrounded by a doted line.

A signal sent from the host PC 110 through the signal line 130 is input to the port control circuit 162 and the PIC circuit 164 through the RS-232C driver 142. A signal sent from the host PC 110 through the signal line 126 is input to the PIC circuit 164 in addition to the UART circuit 144. Further, the port control circuit 162 supplies a signal to the signal line 132 toward the host PC 110.

Next, an operation of the present embodiment will be explained.

It is assumed that the signal output from the host PC 110 to the signal line 130 is H level. In the peripheral device 140, the pull-down resistor 170 is connected with the signal line 130. Thus, the signal line 130 is L level when the connector 122 or 124 has come off, while the signal line 130 is H level when both the connectors 122 and 124 are connected. Therefore, the port control circuit 162 and the PIC circuit 164 can recognize whether or not the peripheral device 140 is connected with the host PC 110, on the basis of the level of the signal line 130.

The port control circuit 162 outputs a predetermined-level signal on the signal line 132, and the pull-down resistor 116 is connected with the signal line 132 in the host PC 110. Thus, like the above, the host PC 110 can recognize whether or not both the connectors 122 and 124 are connected, on the basis of the level of the signal line 132. Further, when the port control circuit 162 sets the signal sent to the signal line 132 to be L level, it is possible to cause the host PC 110 to recognize that the RS-232C cable has been removed. When it is intended to cause the host PC 110 to recognize that the peripheral device 140 is connected, the port control circuit 162 sets the signal sent to the signal line 132 to be H level. This signal functions as taking the place of the pull-up resistor 66 in the first embodiment shown in FIG. 1.

Therefore, the operation of the second embodiment shown in FIG. 3 is the same as that of the first embodiment shown in FIG. 1. Namely, in the steps S1 and S2 of the flow chart shown in FIG. 2, the port control circuit 162 only has to supervise or observe the signal level of the signal line 130. In the step S6 the signal of the signal line 132 is set to be H level instead of turning on the pull-up resistor, and in the step S13 the signal of the signal line 132 is set to be L level instead of turning off the pull-up resistor.

The present invention is applicable to a system composed of plural equipments or to an apparatus including a single equipment.

Further, the present invention includes also a case where, in order to operate various devices to realize the function of the above embodiment, program codes of software for realizing the function of the above embodiment are supplied to a computer (CPU or MPU) in an apparatus connected with the various devices or in a system, and thus the computer in the apparatus or the system operates the various devices according to the supplied and stored program.

In this case, the program codes themselves of the software realize the function of the above embodiment. Thus, the program codes themselves and a means (e.g., a storage medium storing therein the program codes) for supplying the program codes to the computer constitute the present invention. As the storage medium storing the program codes, for example, a floppy disk, a hard disk, an optical disk, a magnetooptical disk, a CD-ROM, a magnetic tape, a non-volatile memory card, a ROM, and the like can be used.

It is needless to say that, not only in the case where the function of the above embodiment is realized by executing the supplied program codes with the computer, but also in a case where the program codes cooperate with an OS (operating system) or another application software functioning on the computer thereby realizing the function of the above embodiment, the program codes are included in the embodiment of the present invention.

Further, it is needless to say that the present invention includes a case where the supplied program codes are once stored in a memory provided in a function expansion board inserted in the computer or a function expansion unit connected with the computer, and then a CPU or the like provided in the function expansion board or the function expansion unit executes all or part of actual processes according to instructions of these program codes, thereby realizing the functions of the above embodiment.

(Third Embodiment)

Hereinafter, the third embodiment of the present invention will be explained in detail with reference to the attached drawings.

Since a block diagram showing the schematic structure of the third embodiment of the present invention is identical with FIG. 1, explanation of each component will be omitted.

In the present embodiment, a shift sequence to a power saving mode will be explained.

As described above, by clock supply to the SIE circuit 46 and the EPC circuit 48, it is possible to suppress power consumption while maintaining a state that communication can be performed by the USB. However, in actuality, when the peripheral device 40 is not used for a long time, it is necessary to reduce the power consumption by stopping the clock supply to the SIE circuit 46 and the EPC circuit 48 to set a mode that the USB communication is not performed. In the following explanation, the power saving mode will indicate that the peripheral device 40 is set in the state that the USB communication can not be performed.

Figure 4:
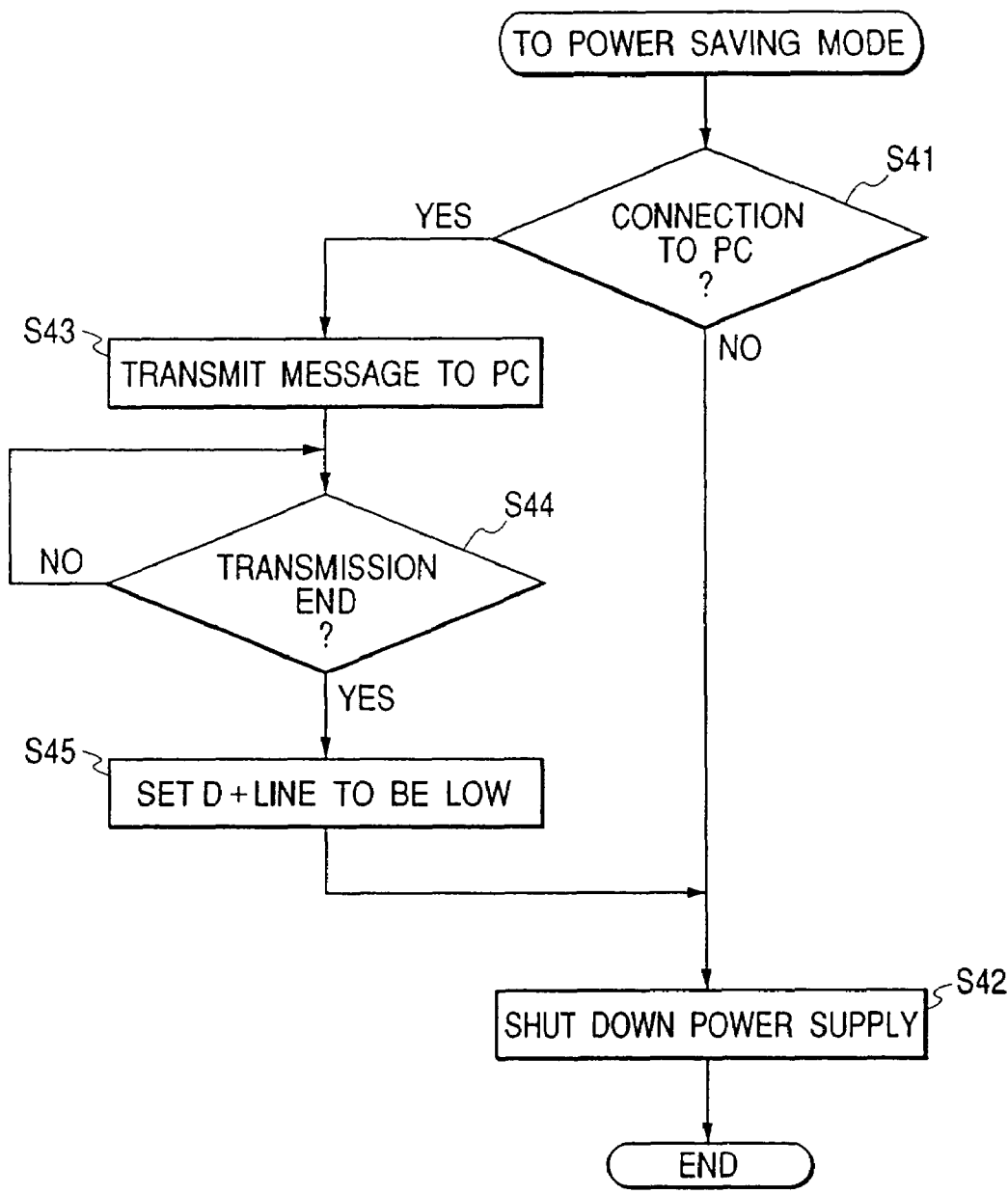
FIG. 4 is a flow chart showing a shifting sequence to a power saving mode in the third embodiment of the present invention.

FIG. 4 is a flow chart showing a shifting sequence to the power saving mode. When the peripheral device 40 comes to be in the power saving mode, it is first checked whether or not the peripheral device 40 is connected with the host PC 10 (S41). This check can be achieved by detecting the level of the VBUS line. If judged that the peripheral device 40 is not connected with the host PC 10 (S41), the power supply of the peripheral device 40 is shut down as it is (S42), and the operation mode is shifted to the power saving mode.

On the other hand, if judged that the peripheral device 40 is connected to the host PC 10 (S41), a message notifying that the operation mode is shifted to the power saving mode is notified to the host PC 10 (S43). The flow waits until this message is transmitted on the USB bus (S44), and then stops pull-down of the D+ line (S45), whereby the power supply of the peripheral device 40 is shut down (S42).

The operation of the host PC 10 concerning the above shifting sequence will be explained.

Figure 5:
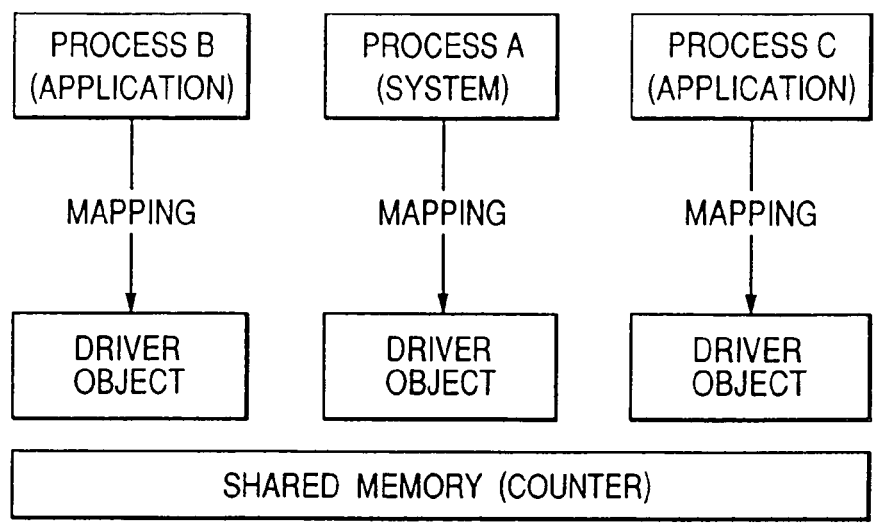
FIG. 5 is a diagram showing an operation model on a host PC (personal computer) 10.

FIG. 5 is a diagram showing an operation model on the host PC 10. For the convenience of explanation, it is assumed that three processes have started. In a first process A which is provided by a system such as an OS (operating system) or the like, when the peripheral device 40 is connected with the USB bus, an driver object correlated with this peripheral device 40 is developed on a memory. The host PC 10 exchanges the data with the peripheral device through this driver object. Thus, only by connecting the peripheral device 40 with the USB bus, the necessary driver object is generated, whereby the communication between the host PC 10 and the peripheral device 40 becomes possible. However, in this state, user application software which uses the peripheral device 40 does not start yet.

A process B is the user application software which uses the device. Also in the process B of the application software, a driver object is mapped in a process space of each application to access the peripheral device 40.

In the present embodiment, the driver object which is mapped in each process performs increment of a counter (initialized by "0") previously prepared in a shared memory to which each process can access, when the driver object itself is generated. Then, the driver object performs decrement of the counter when the driver object itself is deleted.

When there is one application process, the counter is set to be "2". This is because the driver object mapped by the system first performs increment of this counter to be "1", and the driver object mapped by the application process next performs increment of this counter to be "2".

Figure 6:
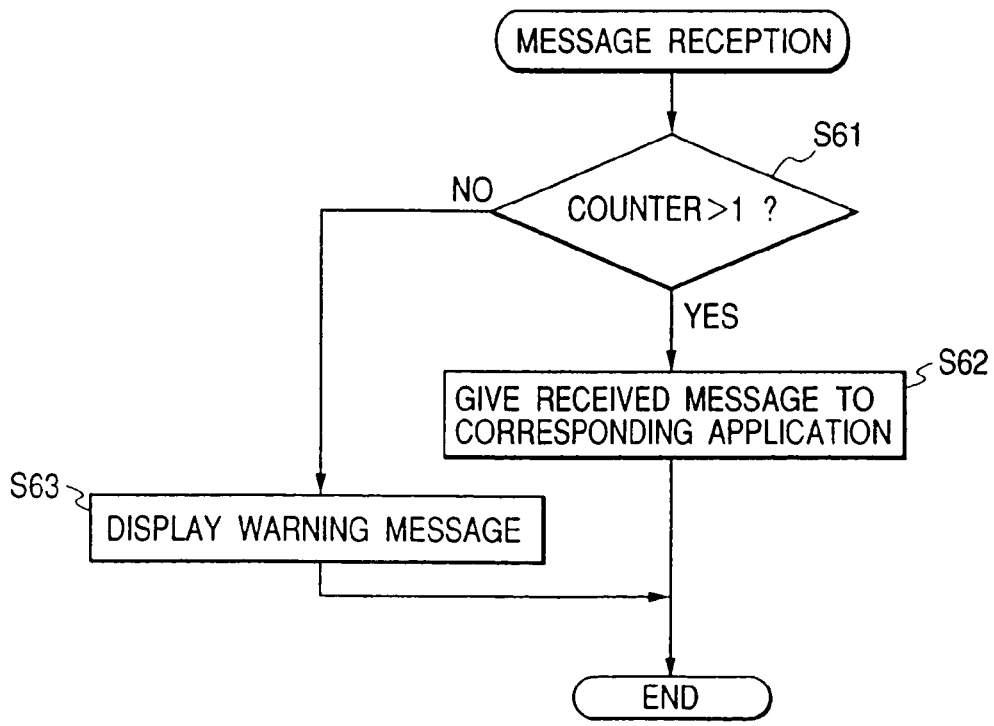
FIG. 6 is a flow chart showing a process to a message sent from a peripheral device.

An operation which is performed when the driver object receives a message from the peripheral device 40 will be explained with reference to FIG. 6.

First, when the message from the peripheral device 40 is received, the value of the counter is checked (S61). If the count value is larger than "1" (S61), it is judged that the application software which manages the message from this device exists, and the received message is given to the corresponding application software at it is (S62).

On the other hand, if the count value is equal to or smaller than "1" (S61), it is judged that the application software which manages the message from this device does not exist, and the driver object itself displays a warning message to notify the user of this fact (S63).

Figure 7:
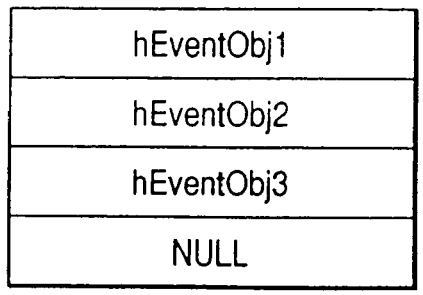
FIG. 7 is a diagram showing a structural example of a table in which event objects are stored.

If it is assumed that also a process C has started simultaneously and thus there are two or more application processes which manage the message from the peripheral device 40, it is possible to manage an event by using a table instead of the above counter. In this case, a table shown in FIG. 7 which stores the event object is arranged in the above sharable memory space, and the event object is registered in this table when the driver object mapped in each process is generated.

By actively signaling the event object, it is possible to inform each process that the message from the device reached.

Figure 8:
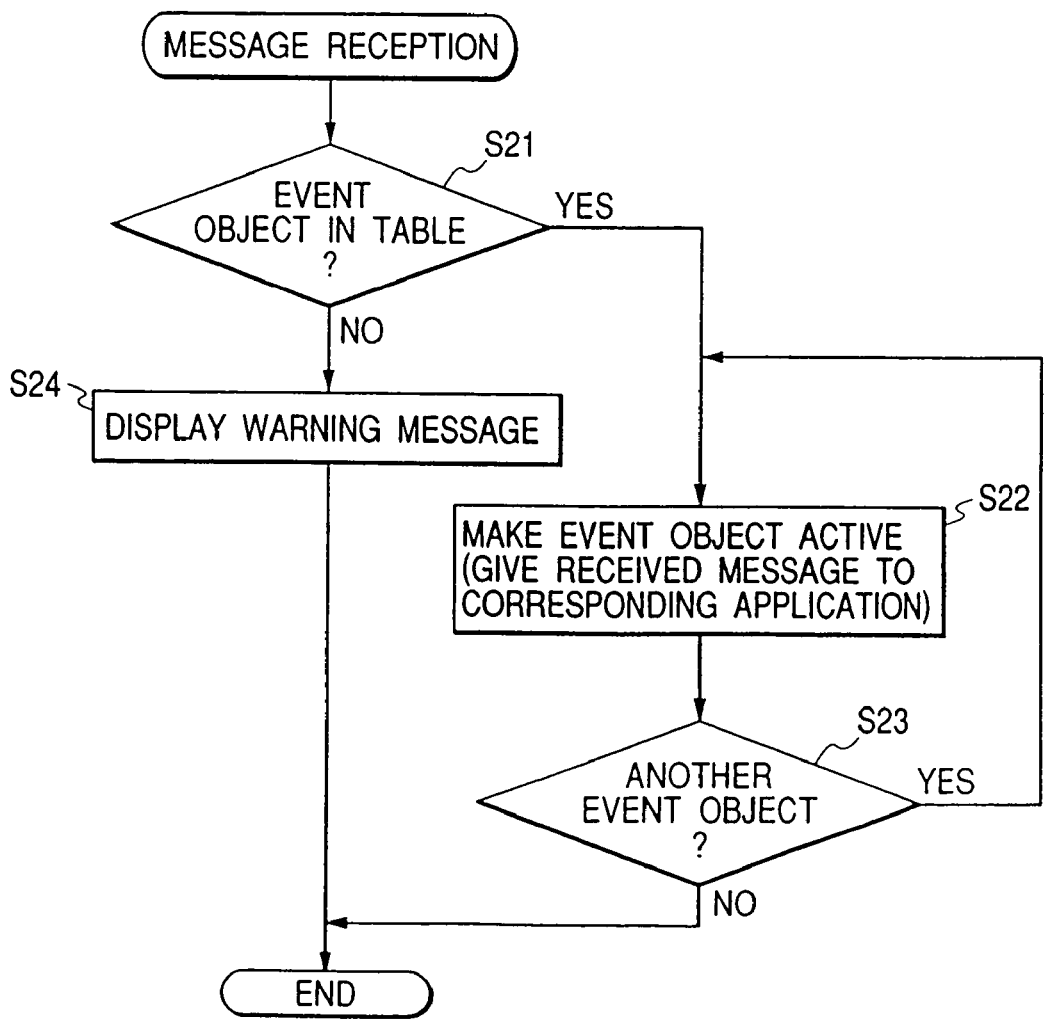
FIG. 8 is a flow chart showing an operation to process the message sent from the peripheral device in a state that plural applications (software) are executed.

FIG. 8 is a flow chart showing an operation which is performed to receive messages sent from the peripheral device 40 and other peripheral devices.

When the message sent from the peripheral device is received, the table of the event object is checked. If as much as one event object has been registered in this table (S21), this event object is set to be active so as to notify the received message to the application software which manages the messages from these peripheral devices (S22). Further, it is judged whether or not another event object has been registered in the table (S23). If judged that another event object has been registered (S23), the flow returns to the step S22 to set this event object to be active (S22). The process in the step S22 is repeated until the event object registered in the table does not exist (S23).

On the other hand, one data is not registered in the table (S21), it is judged that the application software which manages the message sent from this peripheral device does not exist. Thus, the driver object itself displays the warning message to notify the user of this fact (S24).

Thus, even if the application (software) which manages the event from the peripheral device does not exist and the plural applications (software) which manage the events exist, it is possible according to the situation to display the warning such that the displayed warning is comprehensible for the user.

The process generation on the host PC 10 may be changed as follows. FIG. 9 is a diagram showing another process structure on the host PC 10.

Although each process maps the driver object in FIG. 5, only one process maps a driver object in FIG. 9. Here, such the process is called a server process. The server process can be started at the time when the peripheral device is connected with the USB bus, or at the time when the host PC itself is started. The server process has the driver object for the USB peripheral device, and thus functions as the only process which actually communicates with the peripheral device.

The application software which uses the peripheral device is represented by a process A, a process B or a process C shown in FIG. 9. In FIG. 9, the process A is shown as the process provided by system software. However, when the system software does not provide any process for operating the USB peripheral device, all the processes become user applications, whereby these processes are called client processes. The client process exchanges a message with the server process and communicates with the peripheral device.

In the model shown in FIG. 9, in the case where the message sent from the peripheral device is processed, the same event table as that explained in FIG. 5 is held in the server process. Each client process registers the event object to the server process at the time when each client process is started, and waits until the registered event object is set to be active.

The server process processes the message sent from the peripheral device according to the same flow chart as that shown in FIG. 8. If any event object is not registered in the event table, i.e., if any client process does not exist, the driver object itself displays the warning, or the server process displays the warning.

Thus, it is possible to decrease connection between the processes, and consequently it is possible to establish that structure that the client process and the server process exist in independent PC's respectively. Therefore, while giving degree of freedom to the system structure, it is possible according to the situation to display the message from the peripheral device such that the message is comprehensible for the user.

The present invention is applicable to a system composed of plural equipments or to an apparatus including a single equipment.

Further, the present invention includes also a case where, in order to operate various devices to realize the function of the third embodiment, program codes of software for realizing the function of the above embodiment are supplied to a computer (CPU or MPU) in an apparatus connected with the various devices or in a system, and thus the computer in the apparatus or the system operates the various devices according to the supplied and stored program.

In this case, the program codes themselves of the software realize the function of the third embodiment. Thus, the program codes themselves and a means (e.g., a storage medium storing therein the program codes) for supplying the program codes to the computer constitute the present invention. As the storage medium storing the program codes, for example, a floppy disk, a hard disk, an optical disk, a magnetooptical disk, a CD-ROM, a magnetic tape, a nonvolatile memory card, a ROM, and the like can be used.

It is needless to say that, not only in the case where the function of the third embodiment is realized by executing the supplied program codes with the computer, but also in a case where the program codes cooperate with an OS (operating system) or another application software functioning on the computer thereby realizing the function of the third embodiment, the program codes are included in the embodiment of the present invention.

Further, it is needless to say that the present invention includes a case where the supplied program codes are once stored in a memory provided in a function expansion board inserted in the computer or a function expansion unit connected with the computer, and then a CPU or the like provided in the function expansion board or the function expansion unit executes all or part of actual processes according to instructions of these program codes, thereby realizing the function of the third embodiment.

Incidentally, the program for realizing the above embodiments may be installed in driver software which is used in each application program operating on the host computer. In this case, it is unnecessary to store the program for realizing the above embodiments, for each application.

Further, it is possible to decrease a situation that the above embodiments can not be realized according to the application program. Also, it is possible to easily decrease that the user feels a sense of incompatibility that the operation of the peripheral device is different in each application used.

Although the present invention is not limited to the above embodiments. Namely, various modifications and changes are possible in the present invention without departing from the spirit and scope of the appended claims.

What is claimed is:

1. A computer system comprising:
   a host computer;
   a peripheral device, capable of being freely connected to said host computer, adapted to enter into a low power consumption mode under a predetermined condition; and a connection medium adapted to mutually connect said host computer and said peripheral device, and to bi-directionally transmit between said host computer and said peripheral device a connection signal representing a connection state of said host computer and said peripheral device, wherein said peripheral device enters into the low power consumption mode after notifying a user of a predetermined message and obtaining approval of the user to enter into the low power consumption mode.

2. A computer system according to claim 1, wherein the predetermined condition is that a non-communication state continues for a predetermined period of time.

3. A computer system comprising:
a host computer;
a peripheral device, capable of being freely connected to said host computer, adapted to enter into a low power consumption mode under a predetermined condition; and
a connection medium adapted to mutually connect said host computer and said peripheral device, and to bi-directionally transmit between said host computer and said peripheral device a connection signal representing a connection state of said host computer and said peripheral device,
wherein said peripheral device enters into the low power consumption mode after notifying said host computer of a predetermined message, informing a user of a content according to the predetermined message by said host computer, and obtaining approval of the user to enter the low power consumption mode.

4. A computer system according to claim 3, wherein the predetermined condition is that a non-communication state continues for a predetermined period of time.

5. A computer peripheral device which is connected to a host computer, comprising:
a connection medium adapted to bi-directionally transmit between said host computer and said computer peripheral device a connection signal representing a connection state of said host computer and said computer peripheral device;
a non-communication state judgment unit adapted to monitor continuation of communication between said computer peripheral device and said host computer, and to judge whether or not a non-communication state satisfies a predetermined condition;
a non-connection transmission informing unit adapted to, in a case where it is judged by said non-communication state judgment unit that the non-communication state satisfies the predetermined condition, inform said host computer of the non-connection;
a non-connection approval obtaining unit adapted to obtain approval of a user with respect to a content informed by said non-connection transmission informing unit; and
a controller adapted to, after obtaining the approval by said non-connection approval obtaining unit, cause a connection signal transmitter to transmit a signal representing the non-connection to said host computer, and to enter an operation state of said computer peripheral device into a low consumption current mode.

6. A computer peripheral according to claim 5, wherein the predetermined condition is that the non-communication state continues for a predetermined period of time.

7. A computer peripheral according to claim 6, wherein the informing by said non-connection transmission informing unit and the approval of the user by said non-connection approval obtaining unit are performed in said host computer.

8. A computer peripheral according to claim 6, wherein the informing by said non-connection transmission informing unit and the approval of the user by said non-connection approval obtaining unit are performed in said computer peripheral device.

9. A computer peripheral according to claim 6, wherein the informing by said non-connection transmission informing unit and the approval of the user by said non-connection approval obtaining unit are performed in either said host computer or said computer peripheral device.

10. An imaging device which is connected to a host computer, comprising:
a connection medium adapted to bi-directionally transmit between said host computer and said imaging device a connection signal representing a connection state of said host computer and said imaging device;
a non-communication state judgment unit adapted to monitor continuation of communication between said imaging device and said host computer, and to judge whether or not a non-communication state satisfies a predetermined condition;
a non-connection transmission informing unit adapted to, in a case where it is judged by said non-communication state judgment unit that the non-communication state satisfies the predetermined condition, inform said host computer of the non-connection;
a non-connection approval obtaining unit adapted to obtain approval of a user with respect to a content informed by said non-connection transmission informing unit; and
a controller adapted to, after obtaining the approval by said non-connection approval obtaining unit, cause a connection signal transmitter to transmit a signal representing the non-connection to said host computer, and enter an operation state of said imaging device into a low consumption current mode.

11. An imaging device according to claim 10, wherein the predetermined condition is that the non-communication state continues for a predetermined period of time.

12. An imaging device according to claim 11, wherein the informing by said non-connection transmission informing unit and the approval of the user by said non-connection approval obtaining unit are performed in said host computer.

13. An imaging device according to claim 11, wherein the informing by said non-connection transmission informing unit and the approval of the user by said non-connection approval obtaining unit are performed in said imaging device.

14. An imaging device according to claim 11, wherein the informing by said non-connection transmission informing unit and the approval of the user by said non-connection approval obtaining unit are performed in either said host computer or said imaging device.

15. A method performed in a computer system comprising a host computer, a peripheral device, capable of being freely connected to said host computer, the peripheral device being adapted to enter into a low power consumption mode under a predetermined condition, and a connection medium adapted to mutually connect said host computer and said peripheral device, and to bi-directionally transmit between said host computer and said peripheral device a connection signal representing a connection state of said host computer and said peripheral device, the method comprising the steps of:

notifying a user of a predetermined message;
obtaining approval of the user to enter into a low power consumption mode; and
entering the peripheral device into the low power consumption mode after notifying the user of the predetermined message and obtaining approval of the user to enter into the low power consumption mode.

16. A method according to claim 15, wherein the predetermined condition is that a non-communication state continues for a predetermined period of time.

17. A method performed in a computer system comprising a host computer, a peripheral device, capable of being freely connected to said host computer, the peripheral device being adapted to enter into a low power consumption mode under a predetermined condition, and a connection medium adapted to mutually connect said host computer and said peripheral device, and to bi-directionally transmit between said host computer and said peripheral device a connection signal representing a connection state of said host computer and said peripheral device, the method comprising the steps of:
notifying said host computer of a predetermined message;
informing a user of a content according to the predetermined message by the host computer;
obtaining approval of the user to enter into a low power consumption mode; and
entering the peripheral device into the low power consumption mode after notifying said host computer of the predetermined message and obtaining approval of the user to enter the low power consumption mode.

18. A method according to claim 3, wherein the predetermined condition is that a non-communication state continues for a predetermined period of time.

19. A method performed in a computer peripheral device which is connected to a host computer, comprising:
a connection step of bi-directionally transmitting, via a connection medium, between said host computer and said computer peripheral device a connection signal representing a connection state of said host computer and said computer peripheral device;
a non-communication state judging step of monitoring a continuation of communication between said computer peripheral device and said host computer, and judging whether or not a non-communication state satisfies a predetermined condition;
a non-connection transmission informing step of, in a case where it is judged by said non-communication state judging step that the non-communication state satisfies the predetermined condition, informing said host computer of the non-connection;
a non-connection approval obtaining step of obtaining approval of a user with respect to a content informed by said non-connection transmission informing step; and
a control step of, after obtaining the approval by said non-connection approval obtaining step, causing a connection signal transmitter to transmit a signal representing the non-connection to said host computer, and to enter an operation state of said computer peripheral device into a low consumption current mode.

20. A method according to claim 19, wherein the predetermined condition is that the non-communication state continues for a predetermined period of time.

21. A method according to claim 20, wherein the informing by said non-connection transmission informing step and the approval of the user by said non-connection approval obtaining step are performed in said host computer.

22. A method according to claim 20, wherein the informing by said non-connection transmission informing step and the approval of the user by said non-connection approval obtaining step are performed in said computer peripheral device.

23. A method according to claim 20, wherein the informing by said non-connection transmission informing step and the approval of the user by said non-connection approval obtaining step are performed in either said host computer or said computer peripheral device.

24. A method performed in an imaging device which is connected to a host computer, comprising:
a connection step of bi-directionally transmitting between said host computer and said imaging device a connection signal representing a connection state of said host computer and said imaging device;
a non-communication state judging step of monitoring continuation of communication between said imaging device and said host computer, and judging whether or not a non-communication state satisfies a predetermined condition;
a non-connection transmission informing step of, in a case where it is judged by said non-communication state judging step that the non-communication state satisfies the predetermined condition, informing said host computer of the non-connection;
a non-connection approval obtaining step of obtaining approval of a user with respect to a content informed by said non-connection transmission informing step; and
a control step of, after obtaining the approval by said non-connection approval obtaining step, causing a connection signal transmitter to transmit a signal representing the non-connection to said host computer, and enter an operation state of said imaging device into a low consumption current mode.

25. A method according to claim 24, wherein the predetermined condition is that the non-communication state continues for a predetermined period of time.

26. A method according to claim 25, wherein the informing by said non-connection transmission informing step and the approval of the user by said non-connection approval obtaining step are performed in said host computer.

27. A method according to claim 25, wherein the informing by said non-connection transmission informing step and the approval of the user by said non-connection approval obtaining step are performed in said imaging device.

28. A method according to claim 25, wherein the informing by said non-connection transmission informing step and the approval of the user by said non-connection approval obtaining step are performed in either said host computer or said imaging device.

29. A computer readable program stored on a computer readable medium, the program executing a method performed in a computer system comprising a host computer, a peripheral device, capable of being freely connected to said host computer, the peripheral device being adapted to enter into a low power consumption mode under a predetermined condition, and a connection medium adapted to mutually connect said host computer and said peripheral device, and to bi-directionally transmit between said host computer and said peripheral device a connection signal representing a connection state of said host computer and said peripheral device, the method comprising the steps of:
notifying a user of a predetermined message;
obtaining approval of the user to enter into a low power consumption mode; and entering the peripheral device into the low power consumption mode after notifying the user of the predetermined message and obtaining approval of the user to enter into the low power consumption mode.

30. A program according to claim 29, wherein the predetermined condition is that a non-communication state continues for a predetermined period of time.

31. A computer readable program stored on a computer readable medium, the program executing a method performed in a computer system comprising a host computer, a peripheral device, capable of being freely connected to said host computer, the peripheral device being adapted to enter into a low power consumption mode under a predetermined condition, and a connection medium adapted to mutually connect said host computer and said peripheral device, and to bi-directionally transmit between said host computer and said peripheral device a connection signal representing a connection state of said host computer and said peripheral device, the method comprising the steps of:

notifying said host computer of a predetermined message;

informing a user of a content according to the predetermined message by the host computer;

obtaining approval of the user to enter into a low power consumption mode; and entering the peripheral device into the low power consumption mode after notifying said host computer of the predetermined message and obtaining approval of the user to enter the low power consumption mode.

32. A program according to claim 31, wherein the predetermined condition is that a non-communication state continues for a predetermined period of time.

33. A computer readable program stored on a computer readable medium, the program executing a method performed in a computer peripheral device which is connected to a host computer, comprising:

a connection step of bi-directionally transmitting, via a connection medium, between said host computer and said computer peripheral device a connection signal representing a connection state of said host computer and said computer peripheral device;

a non-communication state judging step of monitoring a continuation of communication between said computer peripheral device and said host computer, and judging whether or not a non-communication state satisfies a predetermined condition;

a non-connection transmission informing step of, in a case where it is judged by said non-communication state judging step that the non-communication state satisfies the predetermined condition, informing said host computer of the non-connection;

a non-connection approval obtaining step of obtaining approval of a user with respect to a content informed by said non-connection transmission informing step; and a control step of, after obtaining the approval by said non-connection approval obtaining step, causing a connection signal transmitter to transmit a signal representing the non-connection to said host computer, and to enter an operation state of said computer peripheral device into a low consumption current mode.

34. A program according to claim 33, wherein the predetermined condition is that the non-communication state continues for a predetermined period of time.

35. A program according to claim 34, wherein the informing by said non-connection transmission informing step and the approval of the user by said non-connection approval obtaining step are performed in said host computer.

36. A program according to claim 34, wherein the informing by said non-connection transmission informing step and the approval of the user by said non-connection approval obtaining step are performed in said computer peripheral device.

37. A program according to claim 34, wherein the informing by said non-connection transmission informing step and the approval of the user by said non-connection approval obtaining step are performed in either said host computer or said computer peripheral device.

38. A computer readable program stored on a computer readable medium, the program executing a method performed in an imaging device which is connected to a host computer, comprising:

a connection step of bi-directionally transmitting between said host computer and said imaging device a connection signal representing a connection state of said host computer and said imaging device;

a non-communication state judging step of monitoring continuation of communication between said imaging device and said host computer, and judging whether or not a non-communication state satisfies a predetermined condition;

a non-connection transmission informing step of, in a case where it is judged by said non-communication state judging step that the non-communication state satisfies the predetermined condition, informing said host computer of the non-connection;

a non-connection approval obtaining step of obtaining approval of a user with respect to a content informed by said non-connection transmission informing step; and a control step of, after obtaining the approval by said non-connection approval obtaining step, causing a connection signal transmitter to transmit a signal representing the non-connection to said host computer, and enter an operation state of said imaging device into a low consumption current mode.

39. A program according to claim 38, wherein the predetermined condition is that the non-communication state continues for a predetermined period of time.

40. A program according to claim 39, wherein the informing by said non-connection transmission informing step and the approval of the user by said non-connection approval obtaining step are performed in said host computer.

41. A program according to claim 39, wherein the informing by said non-connection transmission informing step and the approval of the user by said non-connection approval obtaining step are performed in said imaging device.

42. A program according to claim 39, wherein the informing by said non-connection transmission informing step and the approval of the user by said non-connection approval obtaining step are performed in either said host computer or said imaging device.

* * * * *

UNITED STATES PATENT AND TRADEMARK OFFICE
CERTIFICATE OF CORRECTION

| | | |
|---|---|---|
| PATENT NO. | : 7,000,129 B2 | |
| APPLICATION NO. | : 10/677670 | |
| DATED | : February 14, 2006 | |
| INVENTOR(S) | : Masayoshi Sekine et al. | |

It is certified that error appears in the above-identified patent and that said Letters Patent is hereby corrected as shown below:

COVER PAGE:
Item (30) Foreign Application Priority Data, "Aug. 21, 2000 (JP)...11-240906" should read -- Aug. 27, 1999...11-240906--.

COLUMN 2:
Line 21, "a" (first occurrence) should be deleted.

COLUMN 3:
Line 15, "the" should be deleted;
Line 17, "the" should read -- an --; and
Line 33, "the" should read -- an --.

COLUMN 5:
Line 3, "doted" should read -- dotted --.

COLUMN 7:
Lines 46 and 47, "reconnects it, the load of the operation is a little" should read
-- reconnects it. The burden of such operation is small. --.

COLUMN 8:
Line 32, "doted" should read -- dotted --.

COLUMN 10:
Line 22, "an" should read -- a --.

COLUMN 11:
Line 38, "the" (first occurrence) should read -- a --.

UNITED STATES PATENT AND TRADEMARK OFFICE
CERTIFICATE OF CORRECTION

PATENT NO. : 7,000,129 B2
APPLICATION NO. : 10/677670
DATED : February 14, 2006
INVENTOR(S) : Masayoshi Sekine et al.

It is certified that error appears in the above-identified patent and that said Letters Patent is hereby corrected as shown below:

COLUMN 12:
Line 56, "Although the" should read -- The --.

Signed and Sealed this

Twenty-second Day of May, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,000,129 B2 | |
| APPLICATION NO. | : 10/677670 | |
| DATED | : February 14, 2006 | |
| INVENTOR(S) | : Masayoshi Sekine et al. | |

It is certified that error appears in the above-identified patent and that said Letters Patent is hereby corrected as shown below:

COVER PAGE:
(30) Foreign Application Priority Data, "Aug. 21, 2000 (JP)...11-240906" should read -- Aug. 27, 1999...11-240906 --.

COLUMN 2:
Line 21, "a" (first occurrence) should be deleted.

COLUMN 3:
Line 15, "the" should be deleted;
Line 17, "the" should read -- an --; and
Line 33, "the" should read -- an --.

COLUMN 5:
Line 3, "doted" should read -- dotted --.

COLUMN 7:
Lines 46 and 47, "reconnects it, the load of the operation is a little" should read -- reconnects it. The burden of such operation is small. --.

COLUMN 8:
Line 32, "doted" should read -- dotted --.

COLUMN 10:
Line 22, "an" should read -- a --.

COLUMN 11:
Line 38, "the" (first occurrence) should read -- a --.

UNITED STATES PATENT AND TRADEMARK OFFICE
CERTIFICATE OF CORRECTION

PATENT NO. : 7,000,129 B2
APPLICATION NO. : 10/677670
DATED : February 14, 2006
INVENTOR(S) : Masayoshi Sekine et al.

It is certified that error appears in the above-identified patent and that said Letters Patent is hereby corrected as shown below:

<u>COLUMN 12</u>:
Line 56, "Although the" should read -- The --.

Signed and Sealed this

Fifth Day of June, 2007

JON W. DUDAS
*Director of the United States Patent and Trademark Office*